June 21, 1932.   E. H. STEEDMAN   1,864,325
SUPPLY CONDUIT FOR PISTON MACHINES
Filed May 5, 1930
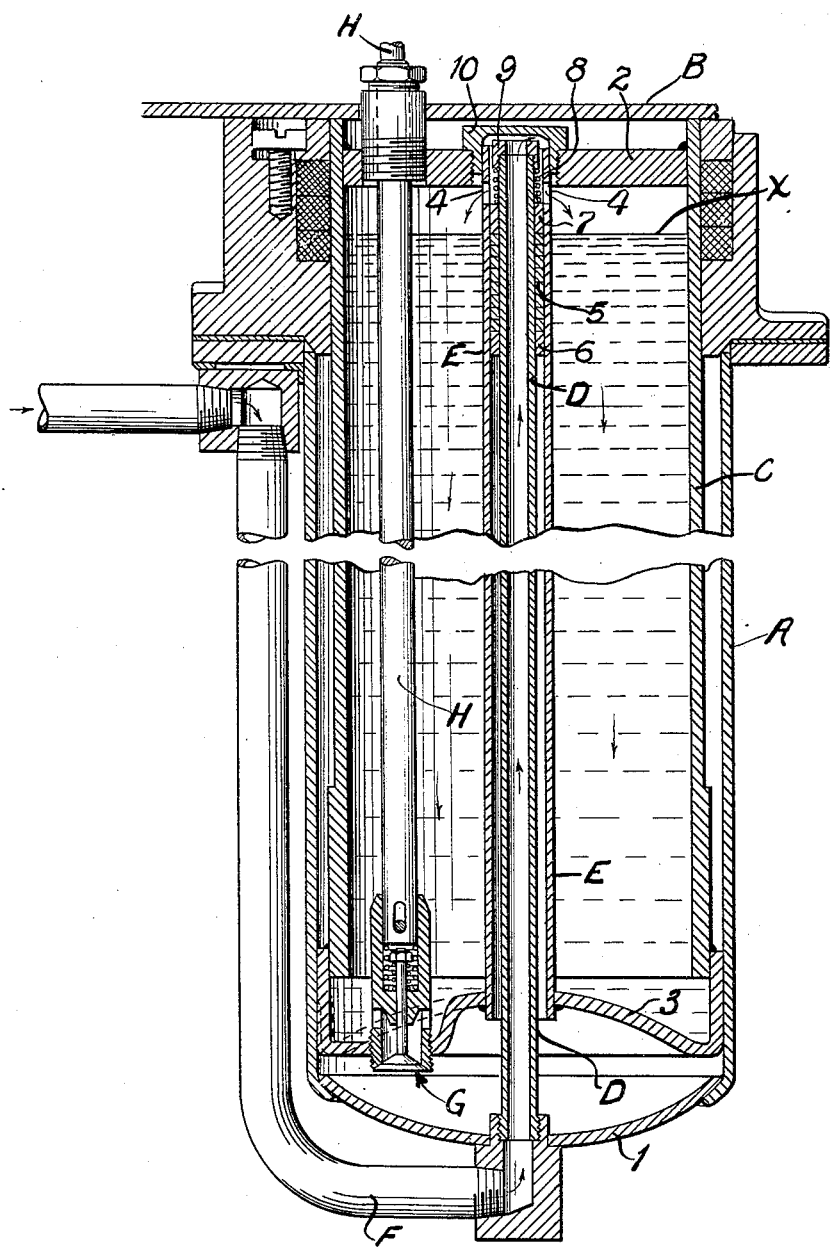
INVENTOR:
EDWIN H. STEEDMAN.
BY Bakewell & Church
ATTORNEYS.

Patented June 21, 1932

1,864,325

UNITED STATES PATENT OFFICE

EDWIN H. STEEDMAN, OF ST. LOUIS, MISSOURI, ASSIGNOR TO CURTIS MANUFACTURING COMPANY, OF WELLSTON, MISSOURI, A CORPORATION OF MISSOURI

SUPPLY CONDUIT FOR PISTON MACHINES

Application filed May 5, 1930. Serial No. 449,848.

This invention relates to piston machines of the type in which compressed air or another suitable gaseous operating medium is introduced into a hollow piston above the level of a body of oil or other incompressible liquid in said piston, so as to move the piston in one direction and cause liquid to pass from the piston into the space between opposed portions of the piston and cylinder. The invention relates particularly to automobile lifts and other piston machines of the kind in which the piston projects from one end of the cylinder and is connected to a part, such as a platform, that is actuated by the piston.

If a hose or other similar flexible conduit is attached to the outer end of the piston of such a machine, for introducing the gaseous operating medium into the piston, said conduit is always in the way and considerable trouble and expense is involved in keeping the conduit in an operative condition. One of the main objects of my invention is to provide a novel means for supplying a gaseous operating medium to a hollow piston which reciprocates in a cylinder, that overcomes the necessity of using a hose or similar flexible conduit that is located on the exterior of the machine, and which flops back and forth when the piston is in operation. To this end I have devised a machine of the general type referred to, in which the means used to supply or introduce the operating medium into the hollow piston is housed within the cylinder and is composed of a tubular portion on the piston closed at one end and having a port or opening that leads to the interior of the piston, a stationary supply pipe connected at one end to the cylinder and arranged in telescopic relation with the tubular portion on the piston, and a packing for producing and maintaining a tight joint between the telescoped parts of said supply means that are mounted on the piston and cylinder.

Another object is to provide a machine of the kind just described, which is of such design that the inner end portion of the piston is capable of sufficient lateral movement or side play, relative to the side wall of the cylinder to satisfy operating conditions, without liability of injuriously affecting the packing above referred to, or causing the said tubular portion of the piston to bind on the stationary supply pipe with which it co-acts, when the piston is in operation. To this end I propose to attach one end of the supply pipe to the head or inner end of the cylinder, proportion the co-acting tubular portion on the piston so that the annular space between the interior of said tubular portion and the exterior of the supply pipe is great enough to prevent the lateral movement or side play of the piston from causing said parts to bind, and arranging the packing at the free end of the supply pipe or at a point remote from the connection between the supply pipe and the cylinder.

I have herein illustrated my invention embodied in a hydro-pneumatic machine that is intended to be used to operate the vertically-movable platform or chassis supporting portion of an automobile lift, but as previously intimated, I wish it to be understood that my invention is applicable to various other kinds of machines.

The figure of the drawing is a vertical sectional view of a hydro-pneumatic machine embodying my invention.

In the drawing A designates a cylinder, which is herein illustrated as being arranged vertically beneath the platform or chassis supporting portion B of an automobile lift, C designates a hollow piston in said cylinder projecting outwardly from the upper end of the cylinder and connected to the platform B, said hollow piston being adapted to hold a body of oil $x$ or other incompressible liquid, D designates a stationary supply pipe for introducing a gaseous operating medium into the hollow piston C above the level of the oil or other liquid $x$ therein, and E designates a tubular portion on the piston, arranged in telescopic relation with the stationary supply pipe D, and adapted to co-act with same to form a means that is used to supply or introduce the operating medium into the piston. The supply pipe D, which is preferably arranged at the center of the cylinder A, is fastened at its lower end to the head or end wall 1 of the cylinder, and the tubular portion E on the piston which surrounds said supply pipe is fastened to the outer end 2 of the piston and also fastened to the inner end 3 of the piston. A conduit F is attached to the lower end of the stationary supply pipe D, so as to admit a gaseous operating medium to said supply pipe, the operating medium flowing upwardly through the supply pipe D, as indicated by the arrows, and thence escaping to the upper portion of the piston C, through ports 4 in the tubular portion E of the piston that are located above the level of the liquid x in the piston. In the machine herein shown the lower end 3 of the piston C is provided with a check valve G that opens automatically during the admission of the gaseous operating medium to the piston to raise the platform B, and thus permits the liquid x to pass into the space between the head 1 of the cylinder and the opposed inner end 3 of the piston, said valve G seating automatically, and thus trapping the liquid in the cylinder when the supply of the gaseous operating medium to the piston is interrupted or cut off. To lower the platform or cause it to move downwardly, a rod H is actuated so as to open the valve G and hold it open, whereupon the liquid which previously was admitted to the cylinder A will be returned to the piston C by the force which said piston exerts on the liquid in the cylinder A.

A packing of any suitable kind is used to maintain a tight joint between the supply pipe D and the tubular portion E of the piston which surrounds said supply pipe. As shown in the drawing, a stuffing box is arranged at the extreme upper end or free end of the supply pipe D, said stuffing box comprising packing rings 5 arranged between a stationary abutment piece 6 on the exterior of the supply pipe D, and a clamping member 7 that exerts pressure on the packing 5 in a direction to expand the same and cause it to snugly engage the exterior of the supply pipe D and the inner surface of the tubular portion E on the piston. In order that wear on the packing 4 will be automatically taken up, a spring 8 is provided for exerting pressure on the clamping member 7 in a direction to hold the packing 5 in an expanded condition. If desired, a means may be provided for varying the tension of said spring, such, for example, as an adjusting device 9 mounted on the supply pipe. The supply pipe D is preferably so proportioned that when the piston is in its extreme lower position, the terminal end of said supply pipe will be positioned in a removable cap 10 on the upper end 2 of the piston that serves as a closure for the upper end of the tubular portion E of the piston and also serves as a means for connecting said tubular portion to the upper end 2 of the piston. When the cap 10 is removed the gland parts and packing of the stuffing box are accessible. The upper end of the stationary supply pipe D always remains open, and the ports 4 in the tubular portion E of the piston through which the gaseous operating medium is admitted to the interior of the piston, are located above the packing 5 of the stuffing box.

By arranging the supply pipe D for the operating medium inside of the cylinder, I accomplish two highly desirable results: (1) I am able to use a metal tube or pipe, instead of a piece of hose or similar flexible conduit, for introducing the gaseous operating medium into the hollow piston of the machine; and (2) I keep the exterior of the machine free from a flopping part, like a hose, that moves up and down when the piston is in operation. The relatively great distance between the point of connection of the stationary supply pipe D with the cylinder, and the point where the packing 5 is located, and the fact that only the lower end of the supply pipe D is fastened to the cylinder, permits the lower end or inner end portion of the piston to have a slight lateral play or side motion relatively to the side wall of the cylinder, without having an injurious effect on the packing. The lateral play or side movement of the inner end portion of the piston relatively to the side wall of the cylinder, is greatest when the piston is in its lowermost position, as shown in the drawing, but such side play or lateral motion has no effect on the gland parts and packing rings of the stuffing box, due, of course, to the fact that the stationary supply pipe D is mounted in such a way that the upper end portion of same is capable of flexing slightly. As the piston moves upwardly, the lateral play or sidewise displacement of the inner end portion of the piston becomes less and less, and by the time the piston reaches its extreme elevated position, there is not sufficient side play or lateral movement of the piston to have any effect on the stuffing box.

Having thus described my invention, what I claim as new and desire to secure by Letters Patent is:

1. The combination of a cylinder, a hollow piston in said cylinder adapted to hold an incompressible liquid, and a means for introducing a gaseous operating medium into said piston above the level of the liquid therein, comprising a tubular portion on the piston that terminates adjacent the upper end of the piston, a stationary supply pipe carried by the cylinder and extending into said tubular portion, a packing arranged adjacent the upper end of the piston for the annular space between said parts, and means for permitting the operating medium to escape from the supply pipe into the piston.

2. The combination of a cylinder, a hollow piston in said cylinder adapted to hold an incompressible liquid, a means for introducing a gaseous operating medium into said piston above the level of the liquid therein, comprising a tubular portion on the piston, a stationary supply pipe connected to the inner end of the cylinder and projecting into said tubular portion, a packing for the annular space between said parts arranged at a point remote from the connection between said supply pipe and cylinder, and means for permitting the operating medium in said supply pipe to escape into the piston.

3. The combination of a cylinder, a hollow piston in said cylinder adapted to hold an incompressible liquid, a means for introducing a gaseous operating medium into said piston above the level of the liquid therein, comprising a tubular portion on the piston closed at its outer end and having a port leading to the interior of the piston, a stationary supply pipe connected at one end to the head of the cylinder and terminating inside of said tubular portion, and a packing for the space between said tubular portion and supply pipe arranged adjacent the free end of the supply pipe.

4. The combination of a cylinder, a hollow piston in said cylinder, a stationary supply pipe disposed longitudinally of the cylinder and connected to the head or inner end of the cylinder for introducing an operating medium into the piston, a tubular portion on the piston arranged in telescopic relation with said supply pipe and proportioned so as to not contact with or bear upon the supply pipe, and a packing for producing a tight joint between said supply pipe and tubular portion arranged so as to not be injuriously affected by flexing of the supply pipe or side play or lateral movement of the inner end portion of the piston, and means for permitting the operating medium to escape from the supply pipe to the piston.

5. In an automobile lift, the combination of a vertically-disposed cylinder open at its upper end, a hollow piston in said cylinder adapted to hold an incompressible liquid, a platform sustained by said piston, and a gas and liquid-tight conduit for supplying a gaseous operating medium to the hollow piston, composed of co-acting telescoped parts on the piston and cylinder, constructed so that lateral play or sidewise movement of the piston relatively to the side wall of the cylinder, will not cause said parts to bind or separate sufficiently to permit the operating medium to escape through the joint between said parts.

EDWIN H. STEEDMAN.